(12) United States Patent
Terrill et al.

(10) Patent No.: US 7,027,242 B1
(45) Date of Patent: Apr. 11, 2006

(54) METHOD AND APPARATUS FOR MEASURING WRITE-INDUCED POLE TIP PROTRUSION

(75) Inventors: David Terrill, Walnut Creek, CA (US); Kenneth R. Davies, Gilroy, CA (US); Jagdeep S. Buttar, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 10/950,214

(22) Filed: Sep. 23, 2004

(51) Int. Cl.
*G11B 27/36* (2006.01)
*G11B 5/09* (2006.01)
*G11B 5/035* (2006.01)

(52) U.S. Cl. .............................. 360/31; 360/53; 360/65
(58) Field of Classification Search ..................... None
See application file for complete search history.

(56) References Cited

U.S. PATENT DOCUMENTS

| | | | |
|---|---|---|---|
| 4,219,854 A | 8/1980 | Church et al. | |
| 5,793,578 A | 8/1998 | Heim et al. | |
| 6,538,838 B1 | 3/2003 | Sacks et al. | |
| 6,545,841 B1 | 4/2003 | Draz et al. | |
| 6,717,759 B1 | 4/2004 | Himle et al. | |
| 2004/0125478 A1* | 7/2004 | Kim et al. | 360/31 |
| 2005/0057841 A1* | 3/2005 | Stover et al. | 360/59 |

OTHER PUBLICATIONS

Che, Xiaodong, et al., "Utilization of Continuour PES Signal for H/M Component Characterizations," INTERMAG 2003—The 2003 IEEE International Magnetics Conference (Mar. 30-Apr. 3, 2003), Boston, Massachusetts, p. HE-07.

* cited by examiner

*Primary Examiner*—Andrew L. Sniezek
(74) *Attorney, Agent, or Firm*—Carr & Ferrell, LLP; Joshua C. Harrison, Esq.

(57) ABSTRACT

Methods of measuring position error due to pole tip protrusion are provided. In exemplary embodiments, a head having a write element is aligned to a track, and then pole tip protrusion is induced in the write element by writing to the track. The position error is measured after the pole tip protrusion has been induced. The position error can be measured just after the write element stops writing so that the position error is measured before the position error degrades or relaxes. Alignment of the head to the track, and measurement of the position error are accomplished while the head is over a servo segment of the track. The servo segment can be provided with separate alignment and evaluation portions for aligning the head and for measuring the position error, respectively. The alignment and evaluation portions can each encode two parallel sub-tracks, each with a different frequency.

24 Claims, 15 Drawing Sheets

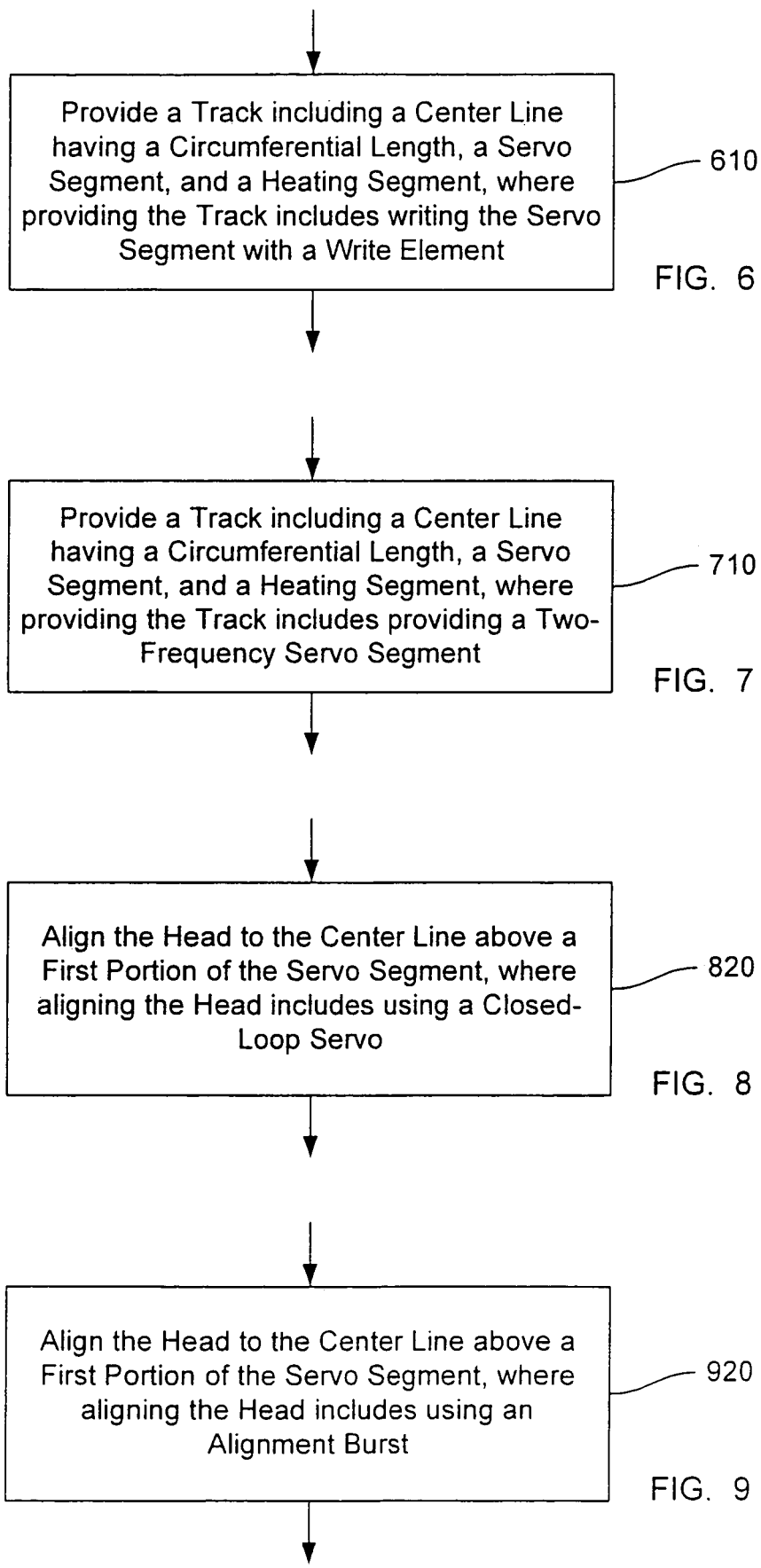

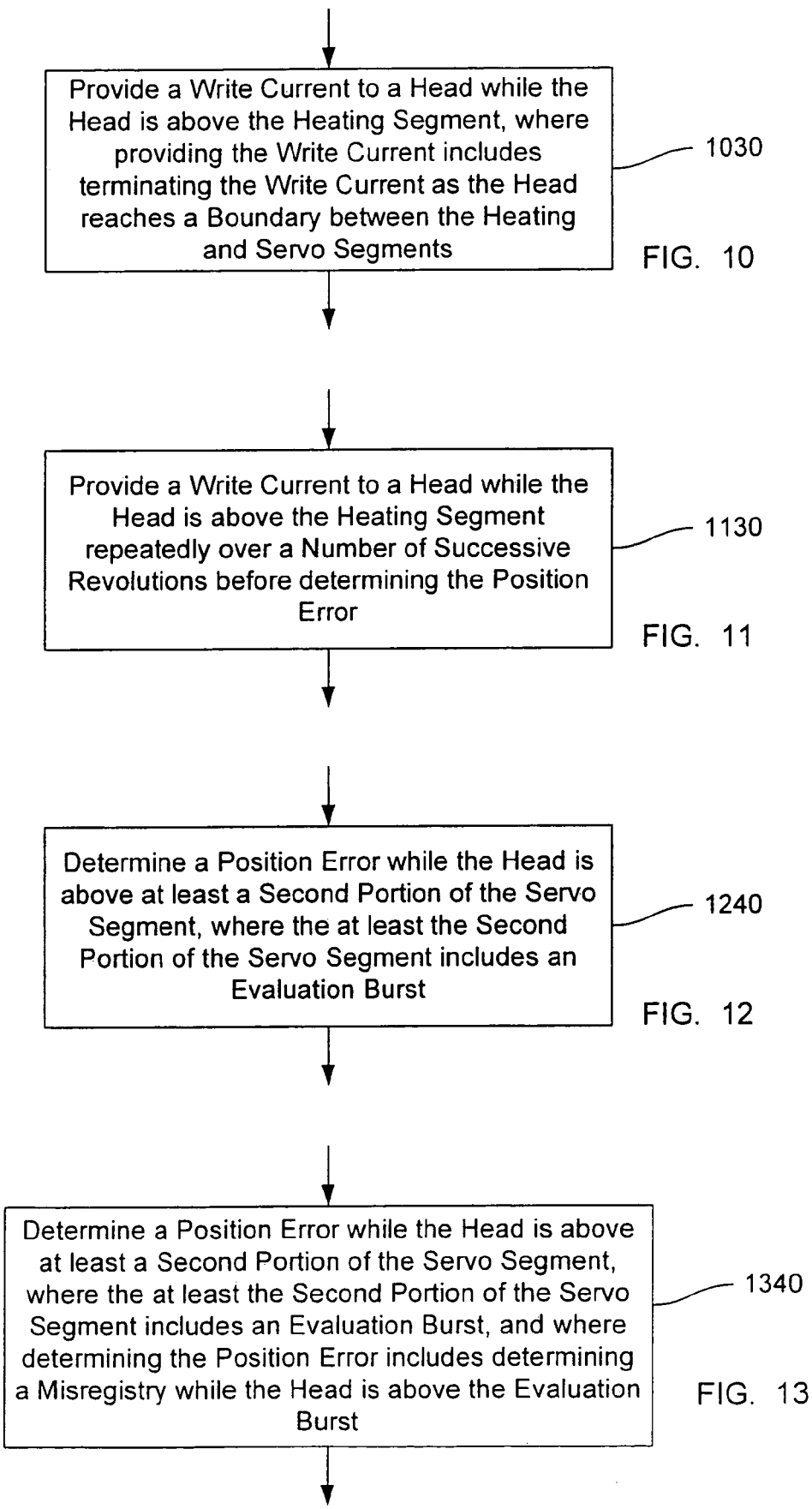

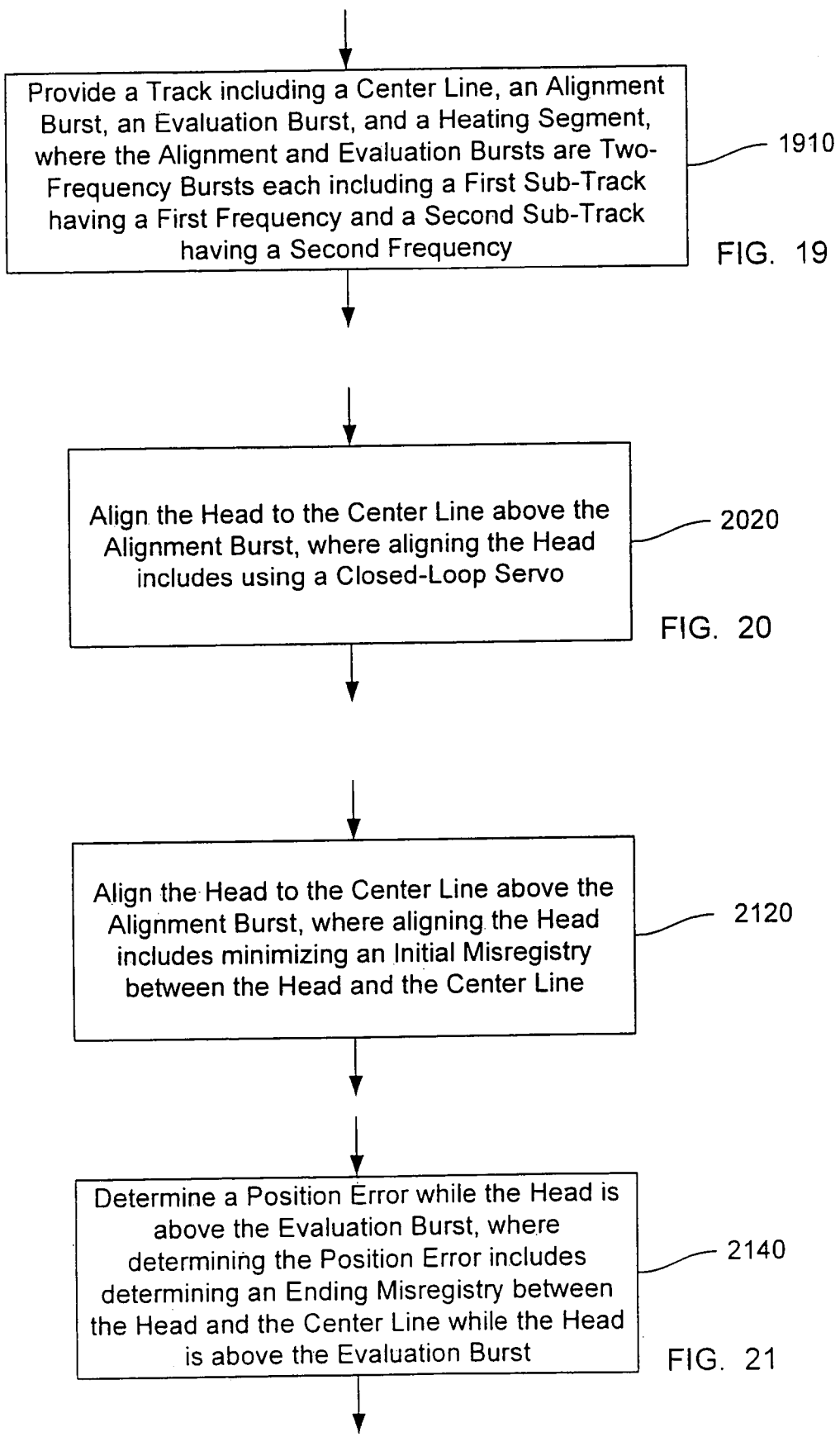

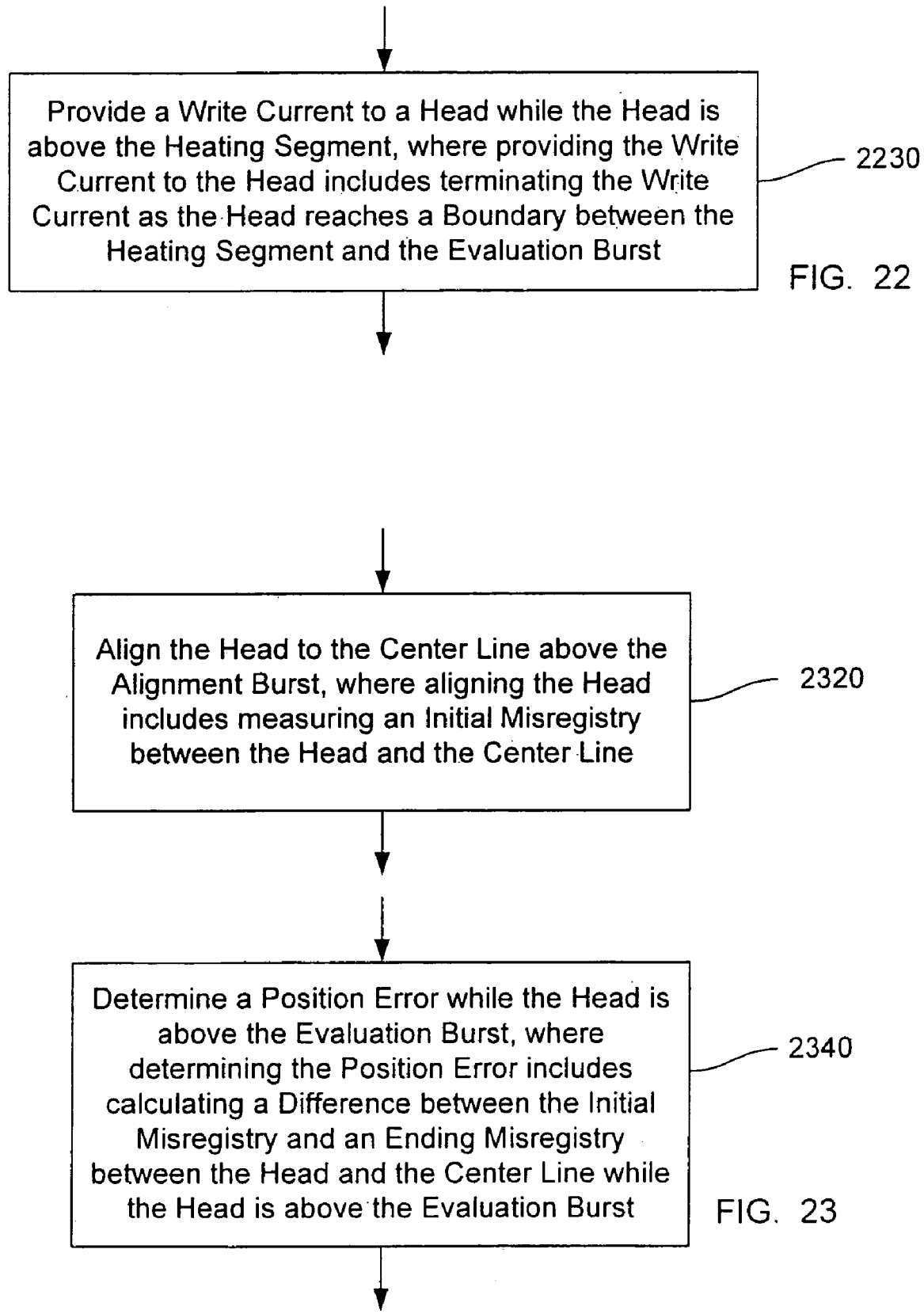

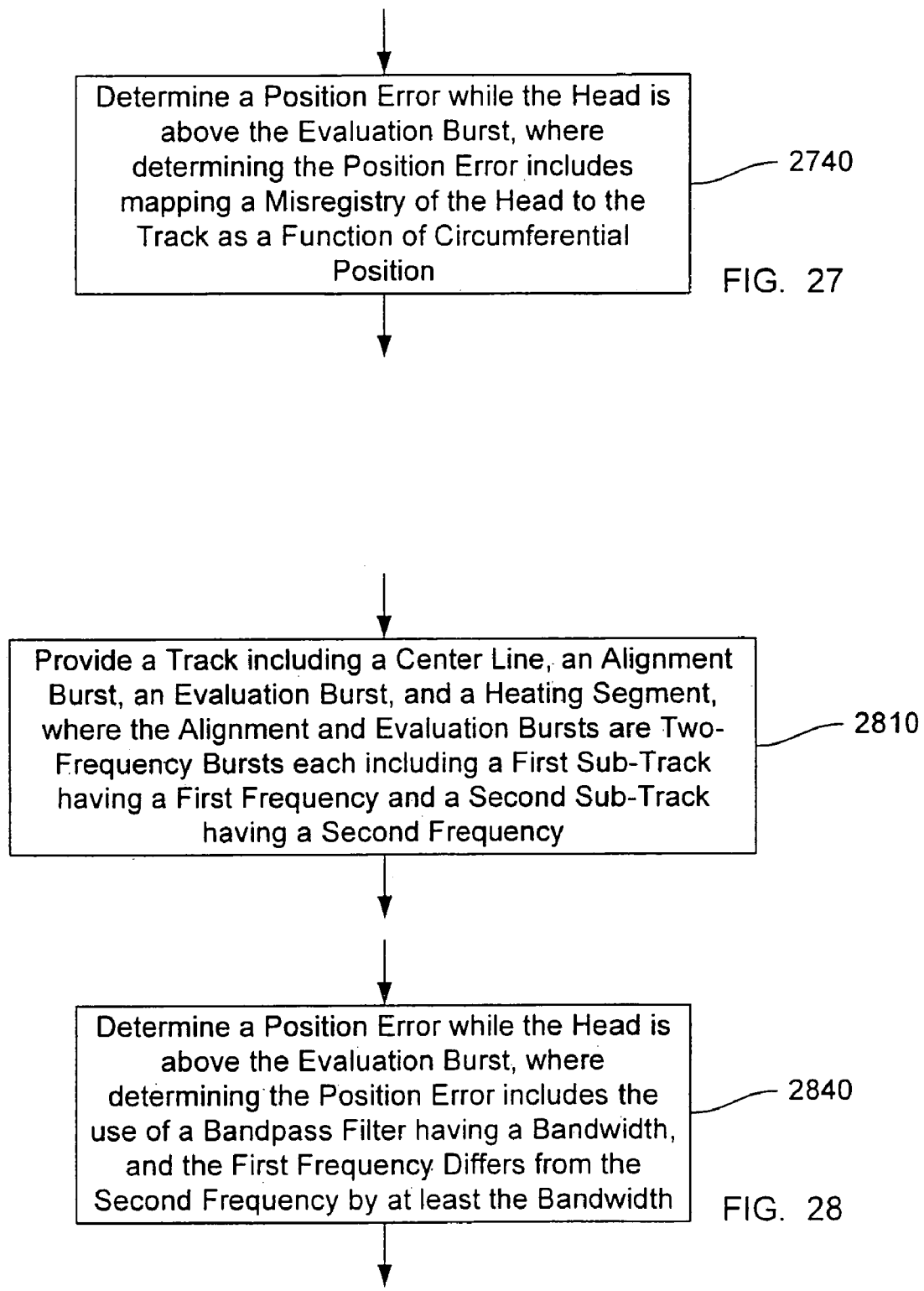

METHOD AND APPARATUS FOR MEASURING WRITE-INDUCED POLE TIP PROTRUSION

BACKGROUND OF THE INVENTION

1. Field of the Invention

The disclosure relates generally to the field of magnetic disk drives, and more particularly to apparatus and methods related to testing disk drive components.

2. Description of the Prior Art

Magnetic disk drives are used to store and retrieve data for digital electronic apparatuses such as computers. A typical magnetic disk drive comprises a head, including a slider and a transducer, in very close proximity to a surface of a rotatable magnetic disk. The transducer, in turn, includes a write element and/or a read element. As the magnetic disk rotates beneath the head, an air bearing is formed between the surface of the magnetic disk and an air bearing surface (ABS) of the slider. The air bearing causes the head to "fly" above the surface of the magnetic disk with a separation ("fly height") on the order of micro-inches or less. As the head flies over the magnetic disk, the write element and the read element can be alternately employed to write and read data bits along a magnetic "track" on the magnetic disk.

Briefly, the write element operates by passing an electric current through a coil wound around a core, or "yoke," to induce a magnetic field therein. In longitudinal recording applications, the yoke is shaped like a horseshoe with a very narrow gap between the two ends. The gap is filled with low magnetic saturation material. Accordingly, in longitudinal recording applications, the magnetic field induced by the electric current must bridge the gap without going through the material within the gap and does so by expanding outward ("fringing") beyond the ABS and to the disk. Data may be written where the magnetic field interacts with the disk.

Unfortunately, generating the magnetic field in the yoke also generates heat that can cause the coil to expand. This expansion produces a force that can cause the write element to distort and protrude beyond the ABS. This effect is known as pole tip protrusion (PTP) and is deleterious because it can decrease the spacing between the head and the disk to the point where the head might contact the magnetic disk. It should be noted that although write elements for perpendicular recording applications are arranged differently than those for longitudinal recording, perpendicular recording write elements are also susceptible to pole tip protrusion for much the same reasons. Even if the head-disk contact is not severe (so-called "soft contact") the contact can affect the alignment between the head and the track and can lead to read/write errors. More severe contacts (so-called "hard contacts") can cause additional read/write errors and/or damage the magnetic recording head transducer. However, the pole tip protrusion due to write-induced heating typically exists only temporarily and on a microscopic scale. Therefore, it has been very difficult to evaluate its effect on the alignment between the head and the disk.

Accordingly, what is needed is a practical method for evaluating misalignment between the head and the track caused by pole tip protrusion.

SUMMARY

An exemplary method of measuring a position error due to pole tip protrusion during writing with a write element of a head comprises providing a track on a disk, aligning the head to the track, writing with the head to the disk, and determining the position error after writing. As provided, the track can include a center line having a circumferential length, a servo segment for measuring misregistry between the head and the track and for aligning the head to the track, and a heating segment for writing to the disk to induce pole tip protrusion. Providing the track can be accomplished, for example, with the write element of the head. In some embodiments, the servo segment includes a two-frequency servo segment in which two parallel sub-tracks each encode a different frequency. Also in some embodiments, the servo segment includes an alignment burst and an evaluation burst.

In some embodiments, aligning the head to the track includes aligning the head to the center line of the track while the head is above a first portion of the servo segment, such as an alignment burst. Aligning the head, in some embodiments, includes using a closed-loop servo to minimize an initial misregistry between the head and the track before writing to the heating segment. In other embodiments, aligning the head includes measuring an initial misregistry value.

Writing with the head to the disk includes providing a write current to the head while the head is above the heating segment to write to the heating segment in order to induce pole tip protrusion. In some embodiments, providing the write current to the head while the head is above the heating segment includes terminating the write current as the head reaches a boundary between the heating segment and the servo segment. Providing the write current to the head while the head is above the heating segment can also be repeated over a number of successive revolutions before determining the position error.

Determining the position error after writing includes determining a difference in misregistries, between the head and track, before and after writing to the heating segment. In some embodiments, determining the position error is accomplished while the head is above at least a second portion of the servo segment, such as an evaluation burst. In those embodiments in which aligning the head includes minimizing the initial misregistry, determining the position error includes determining an ending misregistry. Whereas, in those embodiments in which aligning the head includes measuring the initial misregistry value, determining the position error includes calculating the difference between the initial misregistry value and an ending misregistry.

In further embodiments, a non-PTP position error can be determined after providing the track. The non-PTP position error is used to correct the measurement of the position error due to pole tip protrusion to account for other sources of error. Thus, in some embodiments, determining the position error includes accounting for the non-PTP position error, for example, by adding or subtracting the non-PTP position error.

BRIEF DESCRIPTION OF DRAWINGS

FIGS. 5–29 illustrate various exemplary methods of the present invention.

DETAILED DESCRIPTION

Methods of measuring position error due to pole tip protrusion are provided. In exemplary embodiments, a head is aligned to a track and pole tip protrusion is induced in a write element of the head by writing with the write element to the track. The pole tip protrusion can cause the alignment between the head and the track to change by an amount known as a position error. In a preferred exemplary embodiment of the present invention, the position error is measured after the pole tip protrusion has been induced. In some embodiments, the position error is advantageously measured just after the write element terminates writing so that the position error is measured before the position error can degrade or relax. Additionally, in some embodiments, the track is provided with separate portions for aligning the head and for measuring the position error. The portions can each encode two parallel sub-tracks, each with a different frequency. To better appreciate the embodiments described herein, a description of an exemplary spin stand testing system is first provided with reference to FIG. 1.

Figure 1:
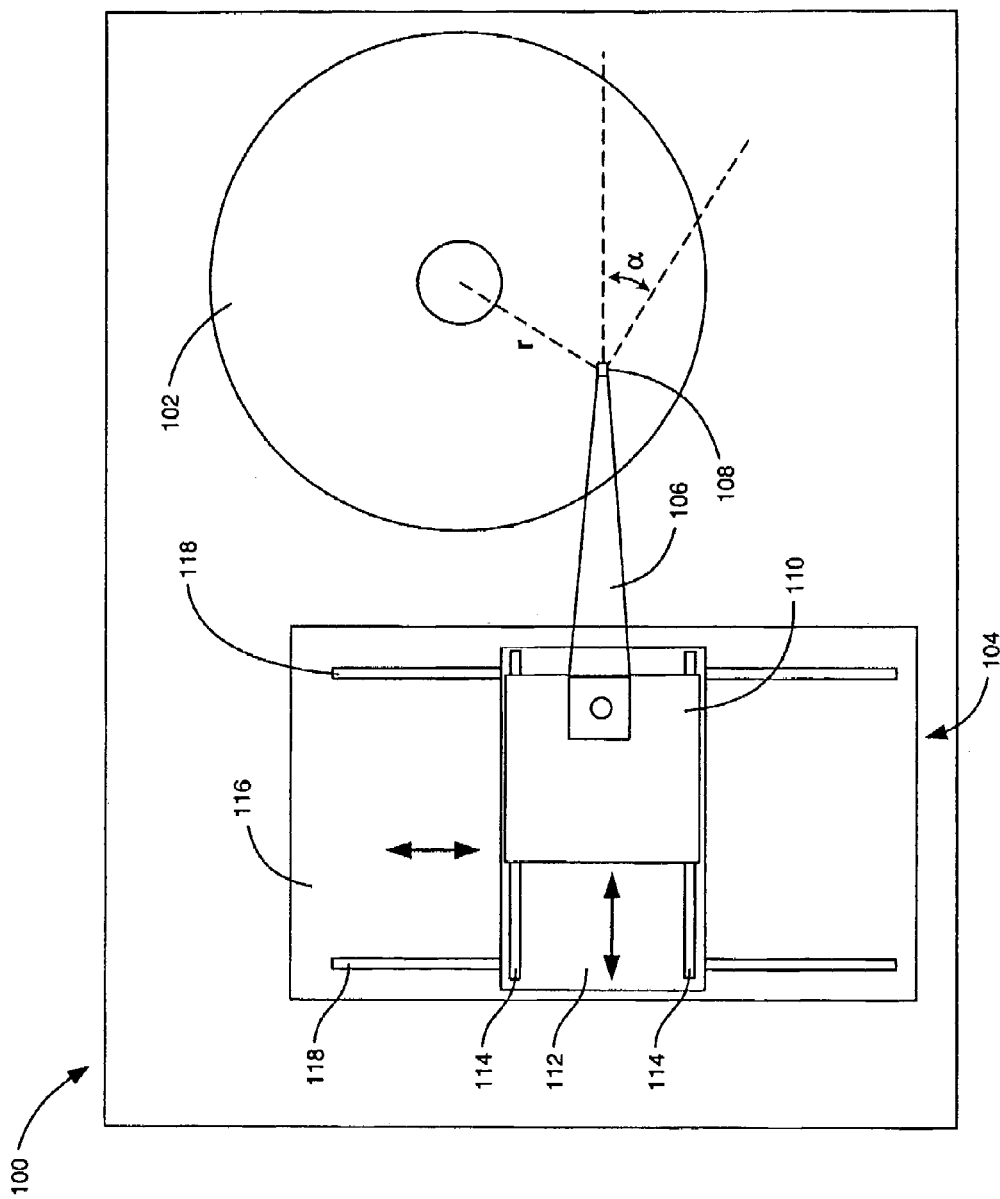
FIG. 1 shows a schematic illustration of an exemplary spin stand testing system for implementing embodiments of the invention.

FIG. 1 is a schematic illustration of an exemplary spin stand testing system 100 for implementing an embodiment of the invention. The spin stand testing system 100 comprises a disk 102 and a positioning device 104. The disk 102 is representative of a magnetic recording disk that would be used in a disk drive and is configured to rotate around an axis at a variable rotation rate. The positioning device 104 secures a head gimbal assembly (HGA) 106, including a head 108, and is configured to position the head 108 to a desired position over the disk 102.

As shown in FIG. 1, an exemplary positioning apparatus for the positioning device 104 comprises two platforms on orthogonal rail systems. More specifically, the HGA 106 is secured to a base 110 on a first platform 112. The first platform 112 includes a set of rails 114 upon which the base 110 can move back and forth in a first direction relative to the first platform 112. A motor (not shown) is one example of a mechanism for driving the base 110 relative to the first platform 112. Similarly, the positioning device 104 also comprises a second platform 116 including a set of rails 118. In this embodiment the first platform 112 is configured to move upon the rails 118 relative to the second platform 116 in a second direction.

By moving the base 110 relative to the first platform 112, and by moving the first platform 112 relative to the second platform 116, the head 108 can be positioned at a desired disk radius, r, and skew angle, α(an angle formed between a longitudinal axis of the HGA 106 and a tangent to a radial line through the head 108). It will be appreciated, however, that various types of positioning means and not just that employed by the positioning device 104 to move the base 110 relative to the disk 102 may be used in accordance with embodiments of the invention.

Turning to methods that can be implemented on the spin stand testing system 100 for measuring position error due to pole tip protrusion, an exemplary embodiment begins by providing a track. The track can be provided as a pre-recorded feature on the disk 102, or can be written to the disk 102 by a write element (not shown) of the head 108 or by a dedicated write element (not shown) of the spin stand testing system 100. Aspects of the track provided by this step are described with respect to FIGS. 2–4.

Figure 2:
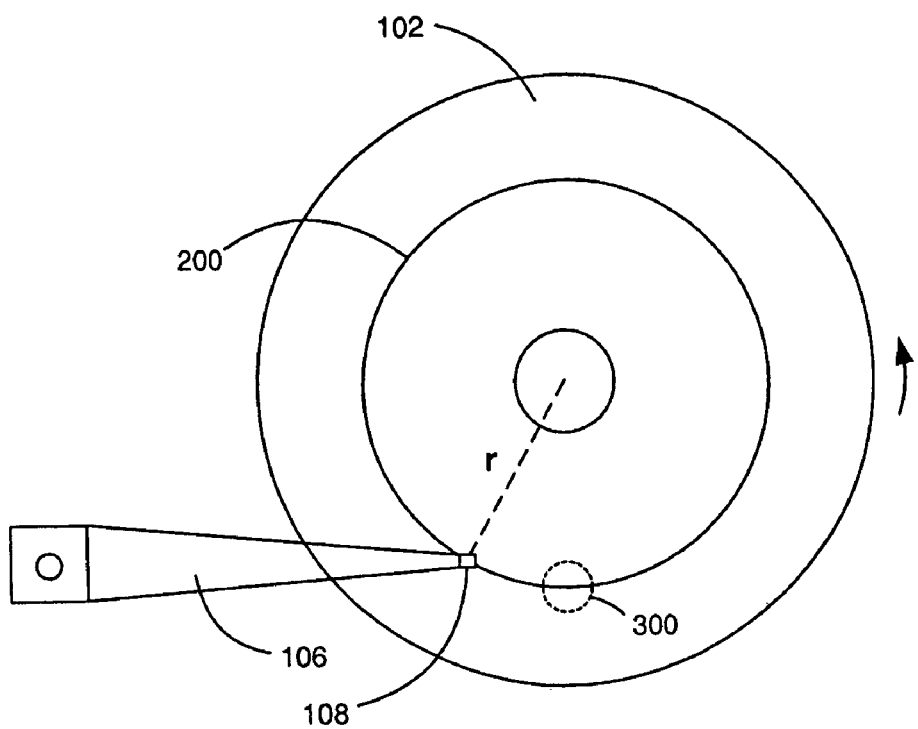
FIG. 2 shows an exemplary track provided for measuring a position error due to pole tip protrusion according to an embodiment of the invention.

FIG. 2 shows an exemplary track 200 provided for measuring a position error due to pole tip protrusion according to some embodiments. The track 200 is disposed at a radius, r, from a center of the disk 102 and has a corresponding circumferential length, l (not labeled), equal to $2\pi r$. The disk 102 rotates in the direction shown, causing the track 200 to pass underneath the head 108. From the frame of reference of the track 200, the head 108 moves in the opposite direction. The frame of reference of the track 200 is used herein where it is more convenient to think of the head 108 as moving over the stationary track 200.

Figure 3:
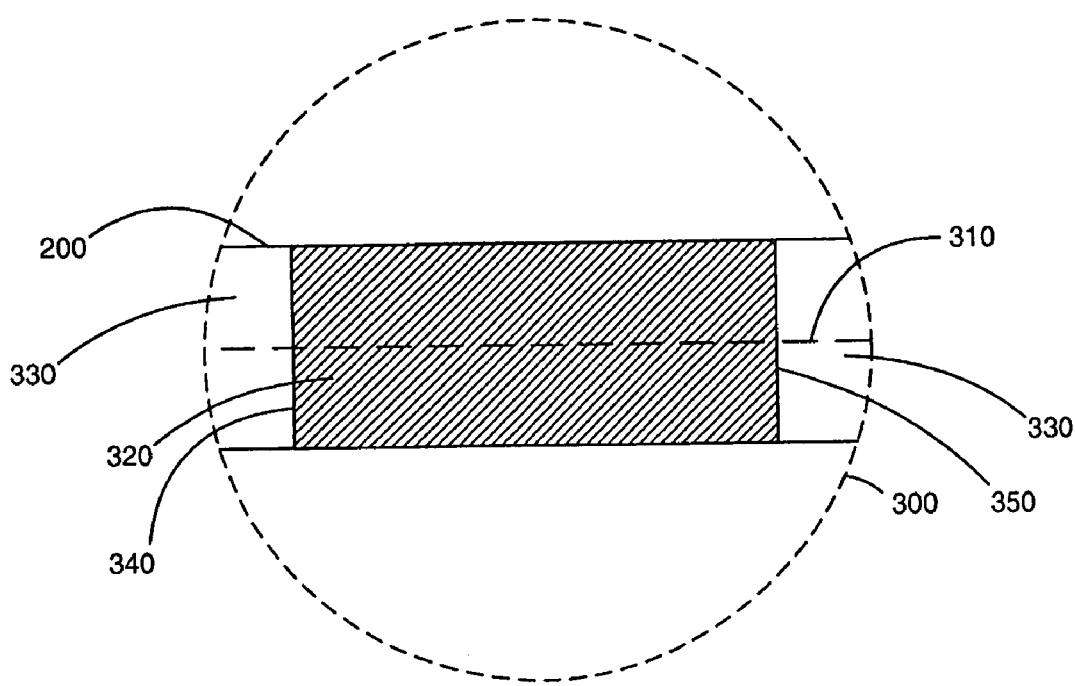
FIG. 3 shows the track of FIG. 2 in more detail.

A circled portion 300 of the disk 102 is shown in more detail in FIG. 3. The portion 300 of the disk 102 shows the track 200 in more detail. The track 200 has a centerline 310, a servo segment 320, and a heating segment 330. As is well known, servo segments on magnetic disks in disk drives are routinely used to maintain the alignment of heads to tracks. Generally, the servo segment 320 includes information that, when read by the head 108 (FIG. 2), can be used to determine a misregistry of the head 108 relative to the track 200. The misregistry generally represents the displacement between the centerline 310 and a center of a read element (not shown) of the head 108.

In some embodiments, the servo segment 320 is a pattern of magnetic bits, commonly referred to as a servo burst, in an asymmetric spatial arrangement with respect to the centerline 310. A read signal from the read element, as the servo burst is passing the head 108, can be used to determine how far and to which side of the centerline 310 the head 108 is disposed. Once this misregistry is known, the head 108 can be repositioned to correct for the misregistry. In disk drives and spin stand testing systems, a feed-back system in which a head reads a signal from a servo segment of a track in order to align the head with the track, as described above, is known as a closed-loop servo.

In addition to the servo segment 320, the track 200 also includes the heating segment 330. As initially provided, the heating segment 330 does not have to contain any data, and in some embodiments it does not. In a subsequent step, a write current is provided to the head 108 while the head 108 is above the heating segment 330 in order to write data to the track 200. By writing data to the track 200, pole tip protrusion can be induced in the write element of the head 108.

In the embodiment shown in FIG. 3, the heating segment 330 begins and ends at the servo segment 320. Thus, in one revolution of the disk 102 (FIG. 1), the head 108 first passes over the servo segment 320, crosses the first boundary 340, then passes over the heating segment 330, and finally crosses the second boundary 350 to pass again over the servo segment 320. As discussed in more detail herein, the heating segment 330 can be partitioned into a series of adjacent sectors, and in some embodiments of the method, only selected sectors of the heating segment 330 are written to. In some embodiments, some or all of the sectors of the heating segment 330 are repeatedly written to over a number of revolutions of the disk 102.

Figure 4:
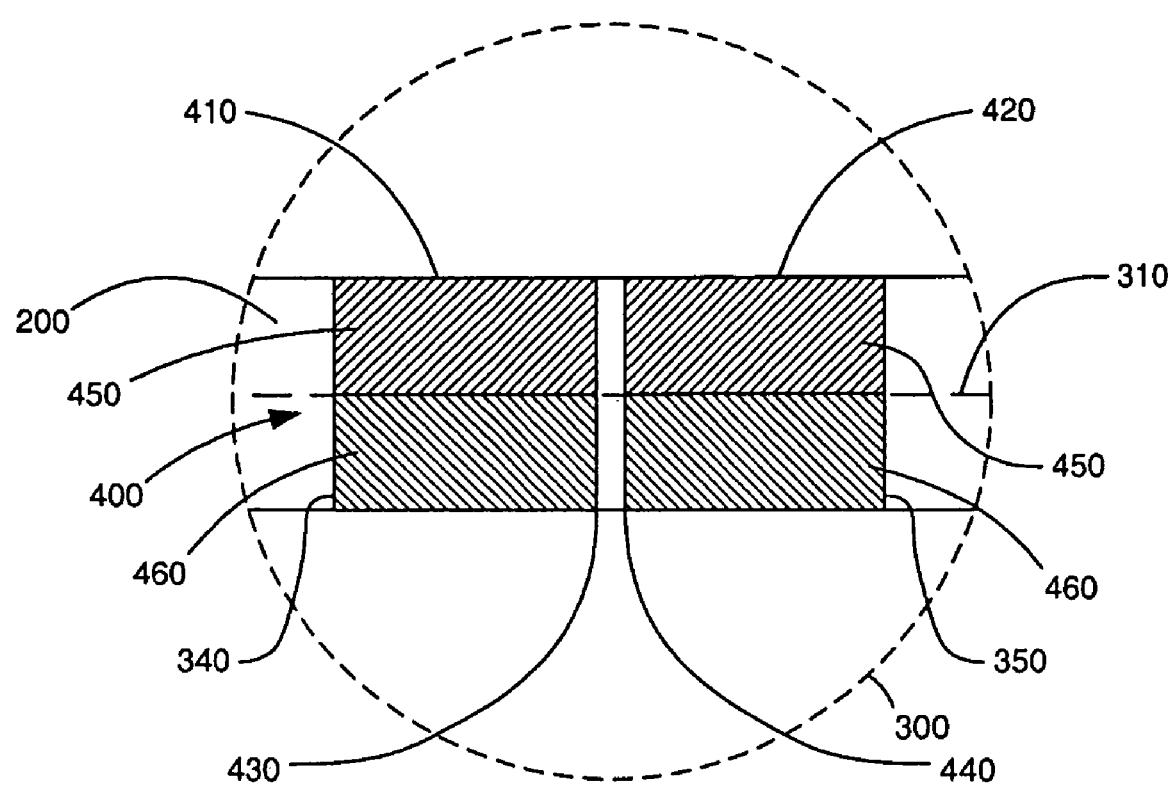
FIG. 4 shows an exemplary servo segment of a track according to an embodiment of the invention.

Returning to the servo segment 320 (FIG. 3), one specific example is a servo segment 400 shown in FIG. 4. Servo segment 400 includes an alignment burst 410 and an evaluation burst 420. While the bursts 410 and 420 appear next to each other in FIG. 4, the distance separating the bursts 410 and 420 as measured along the path traveled by the head 108 from the first boundary 340 to the second boundary 350, is nearly the circumferential length, l. In FIG. 4 a leading edge 430 of the alignment burst 410 is separated from a trailing edge 440 of the evaluation burst 420 by a narrow margin. However, the bursts 410 and 420 can also be adjoining or portions of a single burst.

In some embodiments, the trailing edge 440 of the evaluation burst 420, the leading edge 430 of the alignment burst 410, or the center of the margin between them, is aligned with an index of the disk 102 or another reference mark. An index can be a magnetic marker on an opposite side of a disk that is read by a head disposed on that side of the disk. The signal produced by reading the index is a reference marker to indicate, for instance, the beginning of a track on the data-side of the disk.

As also shown by FIG. 4, each burst 410 and 420 can include, in some embodiments, parallel sub-tracks 450 and 460, where each sub-track 450 and 460 encodes a different frequency. For example, in one embodiment each sub-track 450 encodes a signal with a frequency of 30 mega hertz (MHz) and each sub-track 460 encodes a signal with a frequency of 21.4 MHz. Such bursts are referred to herein as two-frequency bursts.

In an embodiment of the invention, determining the position error includes the use of a bandpass filter having a bandwidth. In this embodiment the first frequency preferably differs from the second frequency by at least the bandwidth. Additionally, in an embodiment of the invention the write element is designed to operate at a data rate frequency. In this embodiment the first and second frequencies of the sub-tracks 450, 460 are preferably substantially less than the data rate frequency.

After providing the track 200 (FIG. 2), in an exemplary embodiment of the method, a write element of the head 108 (FIG. 1) is aligned to the track 200. Aligning the head 108 to the track 200 can include determining that a misregistry exists between the head 108 and the centerline 310 (FIG. 3) of the track 200 and, in some embodiments, can also include repositioning the head 108 relative to the track 200 to change the misregistry. Determining that the misregistry exists can be achieved, for example, by reading the servo segment 320 (FIG. 3). Repositioning the head 108 to minimize the misregistry before writing can be accomplished, for instance, through the use of a feed-back loop, as described below.

As noted, aligning the head 108 to the track 200 can include minimizing the misregistry, for example, by centering the head 108 with respect to the centerline 310 (FIG. 3). A closed-loop servo can be used to align the head 108 to the track 200. In the closed-loop servo, the head 108 reads a portion of the servo segment 320, such as the alignment burst 410 (FIG. 4), to determine the direction and amount of the misregistry. The head 108 is then repositioned by using the feed-back of the closed-loop servo to minimize this misregistry.

Where the alignment burst 410 is a two-frequency burst, the misregistry is determined by comparing the relative strengths of the signals of the two encoded frequencies. The stronger of the two signals indicates which side of the centerline 310 the head is disposed to, while the ratio of the signal strengths correlates to the amount of misregistry between the head and the centerline 310.

As the position error due to pole tip protrusion is ultimately calculated from the difference in the misregistries before and after writing, the misregistry before writing does not have to be zero, but does have to be known. In an embodiment in which the misregistry before writing is not minimized, a value for the misregistry of the head 108 to the track 200 is determined instead. In this embodiment, aligning the head 108 to the track 200 can include repositioning the head 108 to have a specific non-zero misregistry with the track 200. For example, when the position error due to pole tip protrusion is expected to be on the order of a track width, it can be advantageous to align the head 108 to the track 200 such that the head 108 is disposed far to one side of the centerline 310 so that after the position error is created, the head 108 still passes over the servo segment 320 rather than passing around it.

Determining the value of the misregistry, both before and after writing, can be accomplished, for example, by comparison to a pre-determined calibration file. The calibration file can be established by stepping the head 108 across the servo segment 320 in known radial increments. Where the servo segment 320 is a two-frequency alignment burst 410, the ratio of the signals from the two frequencies can be correlated to the position of the head 108. Thereafter, a reading from the two-frequency alignment burst 410 can be compared against the calibration file to determine the value of the misregistry. If a different misregistry is desired, the head 108 can then be repositioned.

After aligning the head 108 (FIG. 1) to the track 200 (FIG. 2), in an exemplary embodiment of the method, a write current is provided to the head 108 while the head 108 is above the heating segment 330 (FIG. 3). As noted above, as the write current induces a magnetic field in the write element, heat generated in the write element can cause pole tip protrusion. Therefore, in order to later measure a position error due to pole tip protrusion, the head 108 is made to write to the heating segment 330.

It will be appreciated that although the heating segment 330 extends from the first boundary 340 to the second boundary 350, the head 108 does not have to write for the entire span of the heating segment 330. It is preferable in some embodiments, however, to arrange the writing such that the writing stops just as the head 108 reaches the second boundary 350 but before the head 108 begins writing over the servo segment 320. Removing the write current as the head 108 reaches the second boundary 350 can be desirable because any misregistry created by pole tip protrusion can begin to degrade or dissipate as soon as the source of heating is removed. Thus, it is often desirable to measure the position error as soon as possible after writing ceases.

It will also be appreciated that the write current can be provided to the head 108 under various conditions. In some embodiments, the write current is provided to the head 108 over a number of successive revolutions in order to model steady-state conditions that develop after repeated cycles. The write current can also be provided to the head 108 at different frequencies to vary the heating rate of the write element. Additionally, other testing parameters can be varied during the step of writing, such as the disk rotation rate, to vary the initial fly height of the head 108.

After the write current has been provided to the head 108, in an exemplary embodiment of the method, a position error is determined while the head 108 is above at least a portion of the servo segment 320. The portion of the servo segment 320 can be, for instance, the evaluation burst 420. Determining the position error includes reading the servo segment 320 with the read element of the head 108 to produce a read signal from which the misregistry after writing can be determined, for example, from a calibration file. The position error is then determined by comparing the misregistry before and after writing, as noted above.

It will be appreciated that, in some embodiments, information other than position error can be determined. For example, as the head 108 passes over the two-frequency evaluation burst 420 shown in FIG. 4, the misregistry of the head 108 to the track 200 can be mapped as a function of circumferential position (which correlates to time) to observe, for example, any degradation in the position error with time. Other effects are also observable in this way. For instance, contact between the head 108 and the disk 102 caused by pole tip protrusion can cause vibrations in the HGA. These vibrations appear as modulations in the plot of misregistry as a function of time, and from the modulations the frequencies of vibrations can be calculated.

In some embodiments, the method also includes measuring a non-PTP position error before measuring the position error caused by pole tip protrusion. The non-PTP position error represents a difference in misregistry over approximately one revolution of the disk that is caused by other effects such as disk run-out. Measuring the non-PTP position error is accomplished in the same manner as measuring the position error caused by pole tip protrusion but without the step of providing the write current to the head 108 while the head 108 is above the heating segment 330.

Accordingly, the head 108 can be first aligned to the track 200 and then the misregistry of the head 108 to the track 200 can be measured after the head 108 has passed over the heating segment 330. The difference in misregistry before and after the head 108 has passed over the heating segment 330 without writing to the heating segment constitutes the non-PTP position error. In these embodiments, therefore, determining the position error due to pole tip protrusion includes accounting for the non-PTP position error. Accounting for the non-PTP position error can involve either adding or subtracting the non-PTP position error to the difference between the misregistry measured before and after writing, depending on whether the non-PTP position error is in the same or opposite direction as the misregistry caused by the pole tip protrusion.

Figure 5:
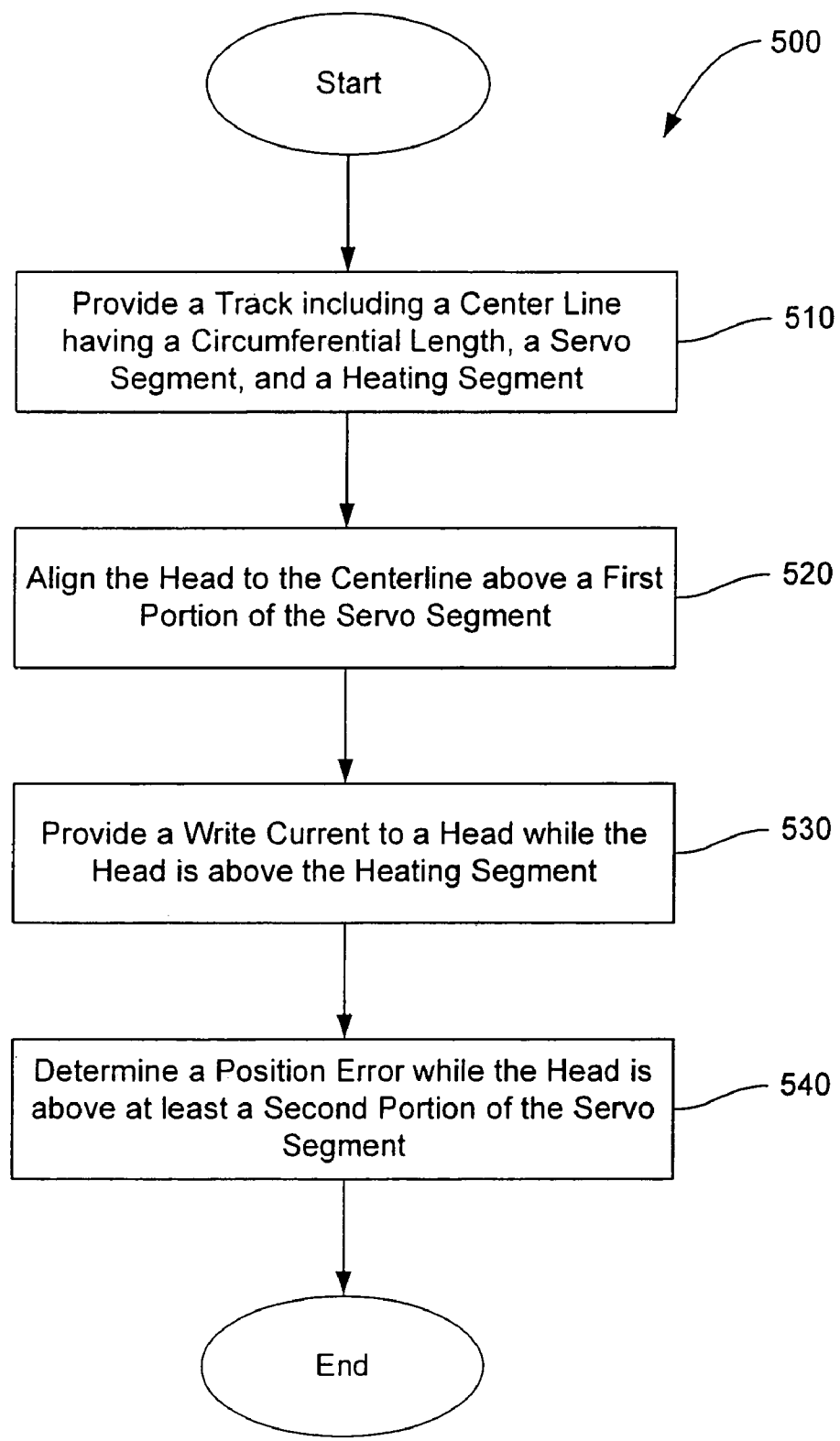
Figure 14:
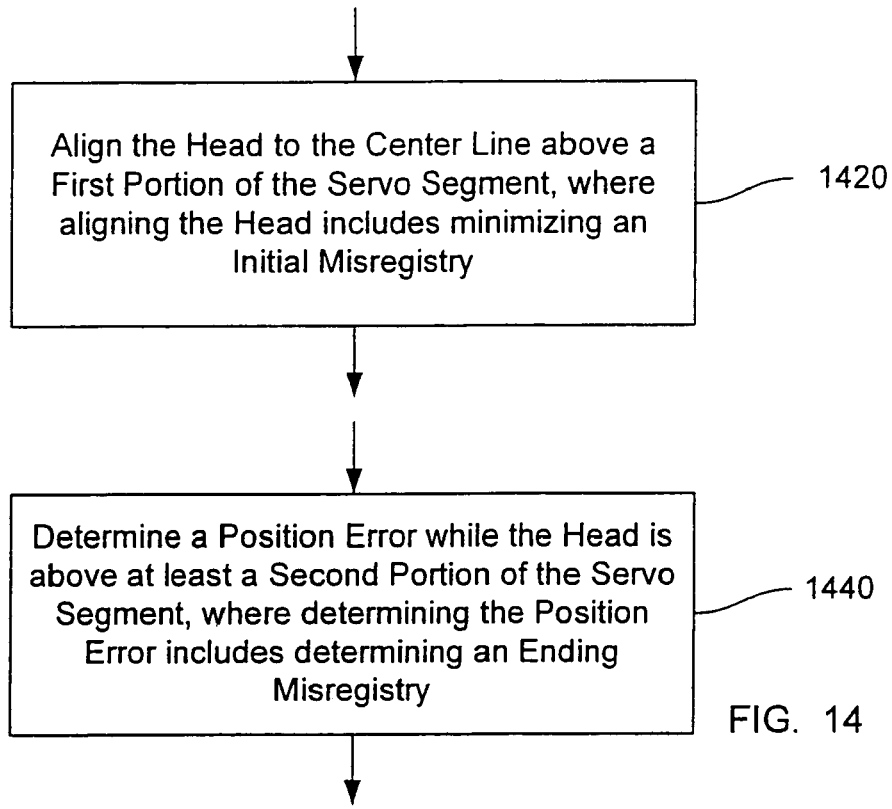
Figure 15:
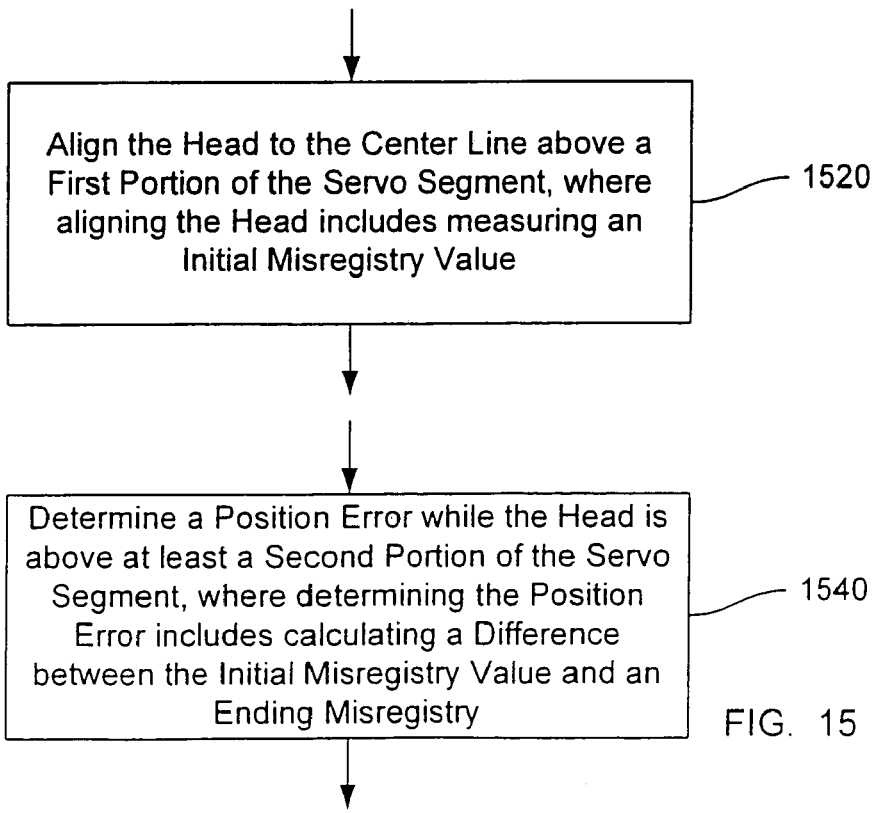

FIG. 5 illustrates an exemplary method 500 of the invention comprising steps 510, 520, 530, and 540. FIGS. 6–15 illustrate various exemplary embodiments of the method 500. In FIGS. 6 and 7 the steps 610 and 710, respectively, replace step 510 in method 500. In FIGS. 8 and 9 the steps 820 and 920, respectively, replace step 520 in method 500. In FIGS. 10 and 11 the steps 1030 and 1130, respectively, replace step 530 in method 500. In FIGS. 12 and 13 the steps 1240 and 1340, respectively, replace step 540 in method 500. In FIGS. 14 and 15 the steps 1420 and 1520, respectively, replace step 520 in method 500, and the steps 1440 and 1540, respectively, replace step 540 in method 500.

Figure 16:
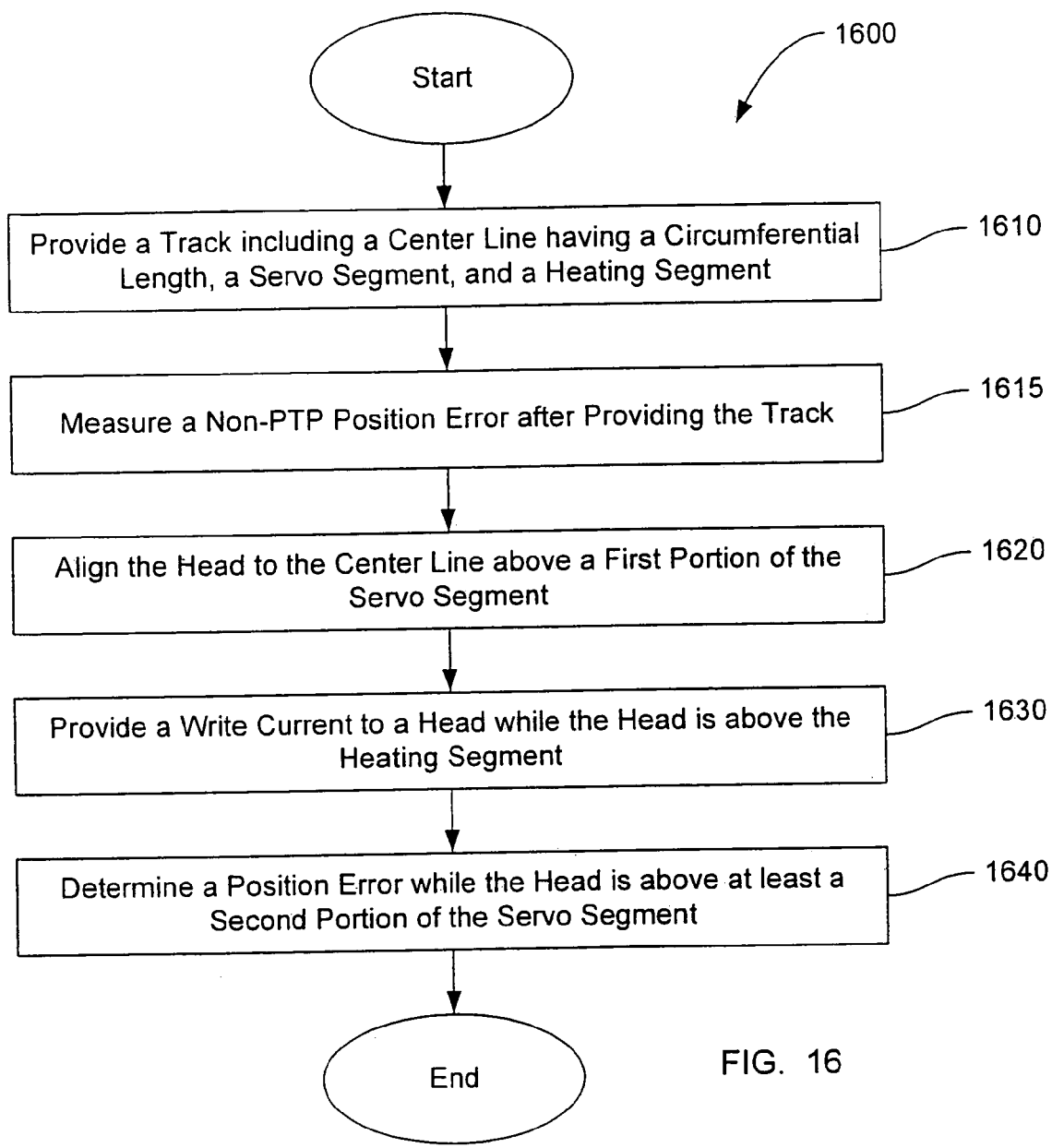
Figure 17:
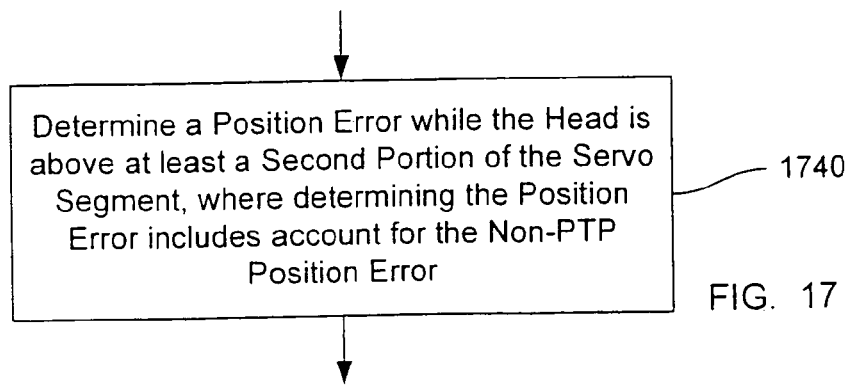

FIG. 16 illustrates an exemplary method 1600 of the invention comprising steps 1610, 1615, 1620, 1630, and 1640. FIG. 17 shows an exemplary embodiment of the method 1600 in which the step 1740 replaces step 1640.

Figure 18:
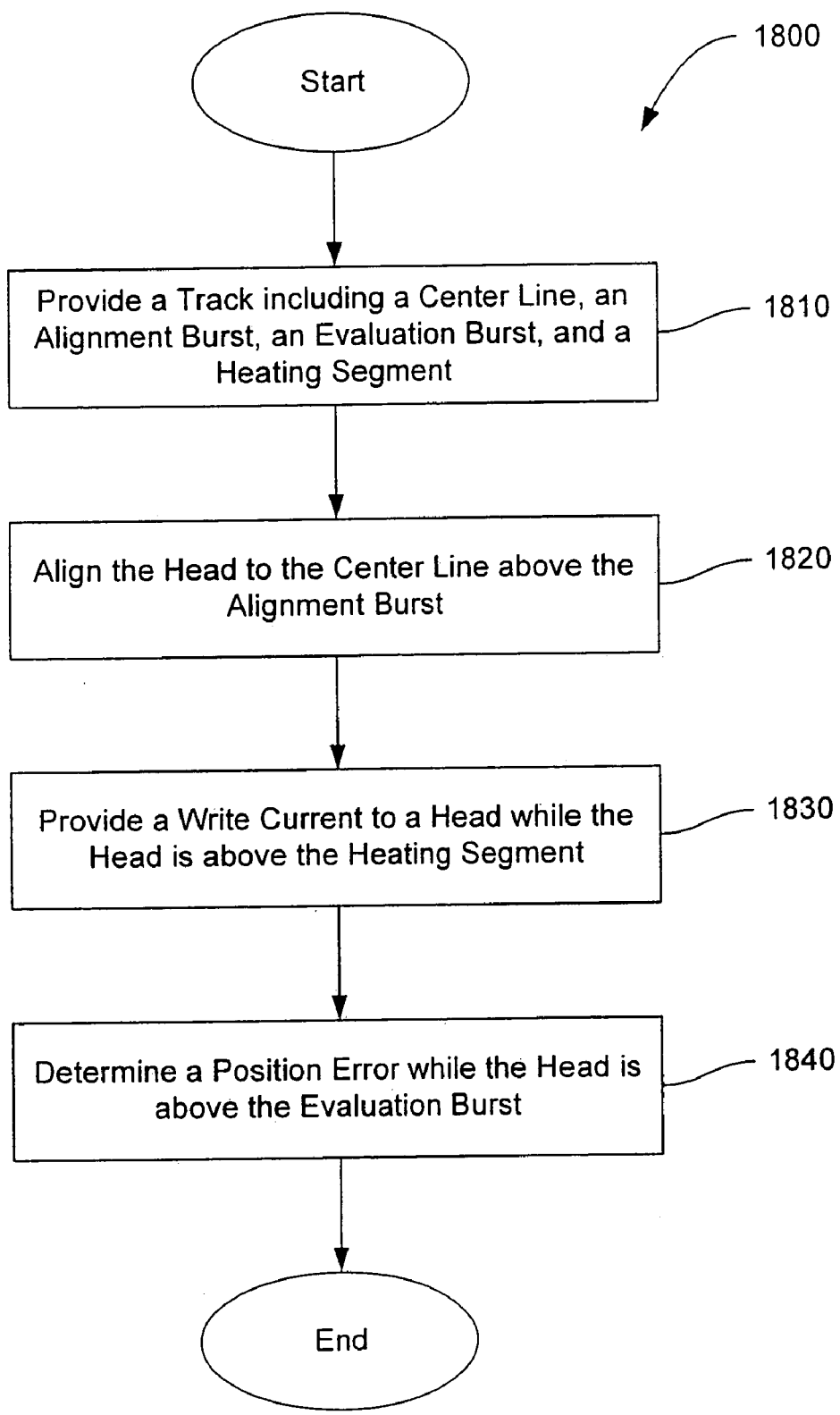
Figure 29:
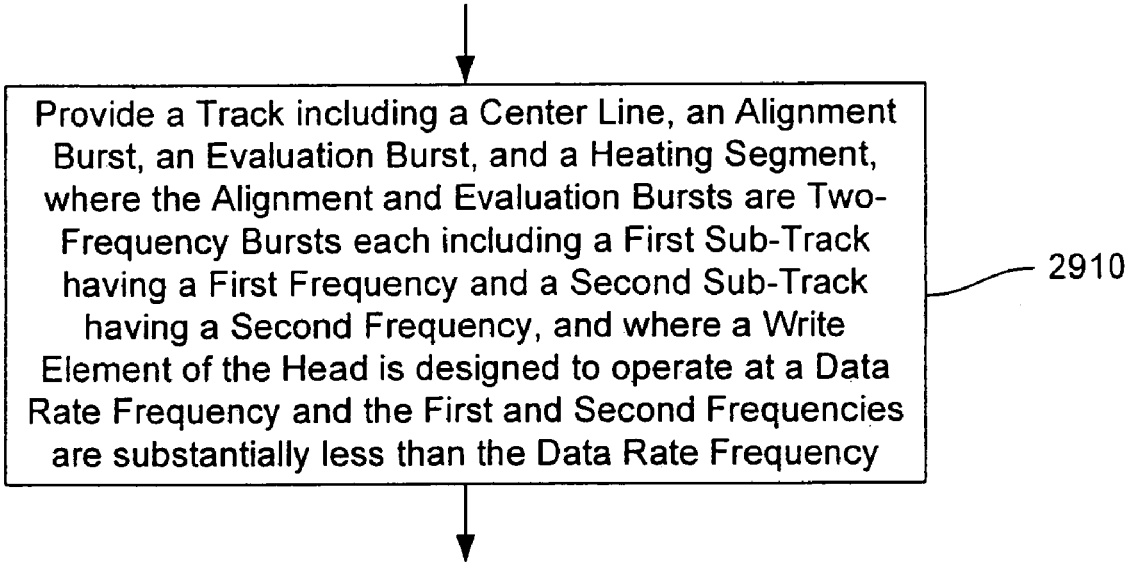

FIG. 18 illustrates an exemplary method 1800 of the invention comprising steps 1810, 1820, 1830, and 1840. FIGS. 19–23 and 26–28 illustrate various exemplary embodiments of the method 1800. In FIG. 19 the step 1910 replaces step 1810 in method 1800. In FIG. 20 the step 2020 replaces step 1820 in method 1800. In FIGS. 21 and 23 the steps 2120 and 2320, respectively, replace the step 1820 in method 1800, and the steps 2140 and 2340, respectively, replace the step 1840 in method 1800. In FIG. 22 the step 2230 replaces step 1830 in method 1800. In FIG. 27 the step 2740 replaces step 1840 in method 1800. In FIG. 28 the steps 2810 and 2840 replace, respectively, the steps 1810 and 1840 in method 1800. In FIG. 29 the step 2910 replaces step 1810 in method 1800.

Figure 24:
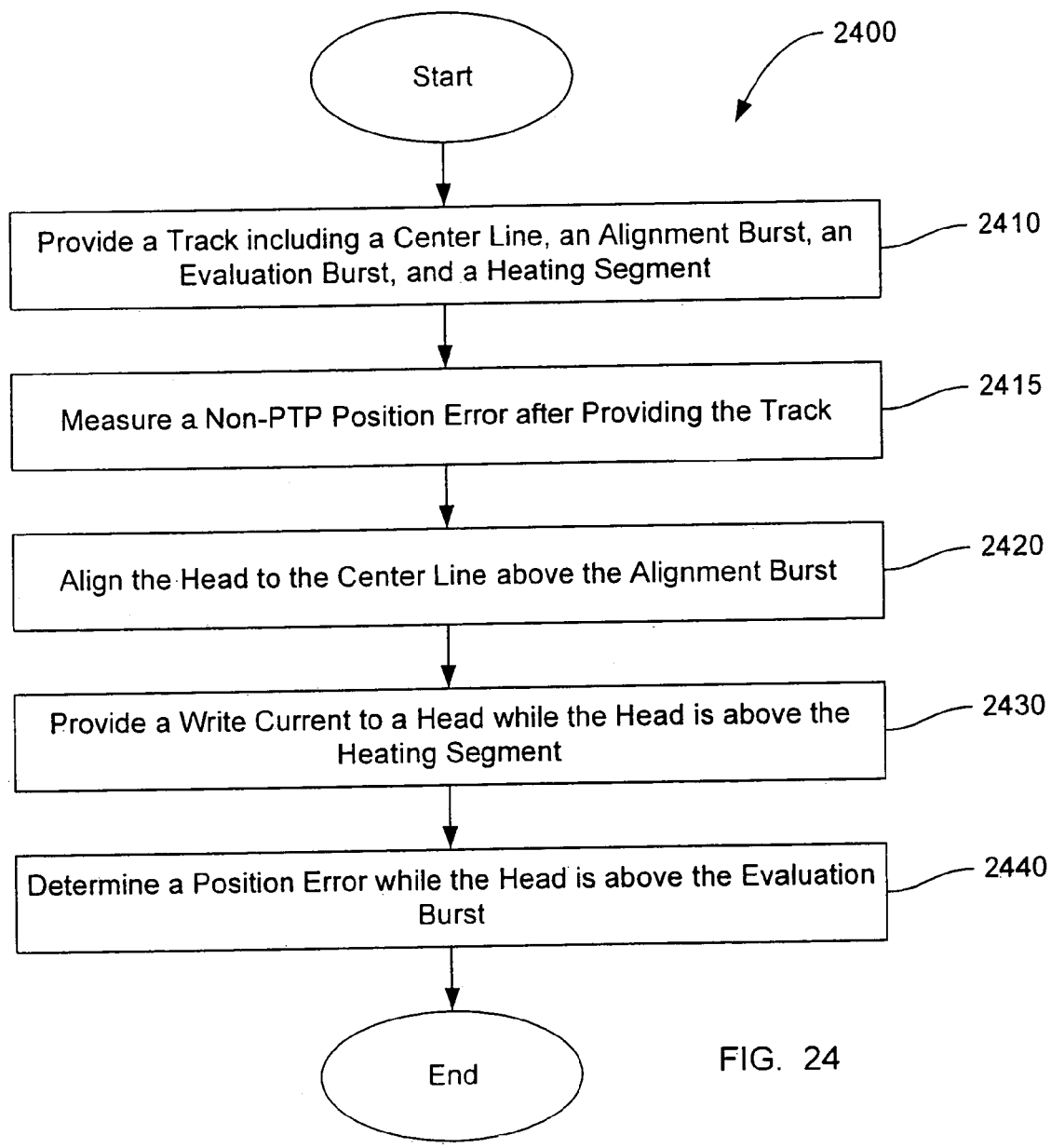
Figure 25:
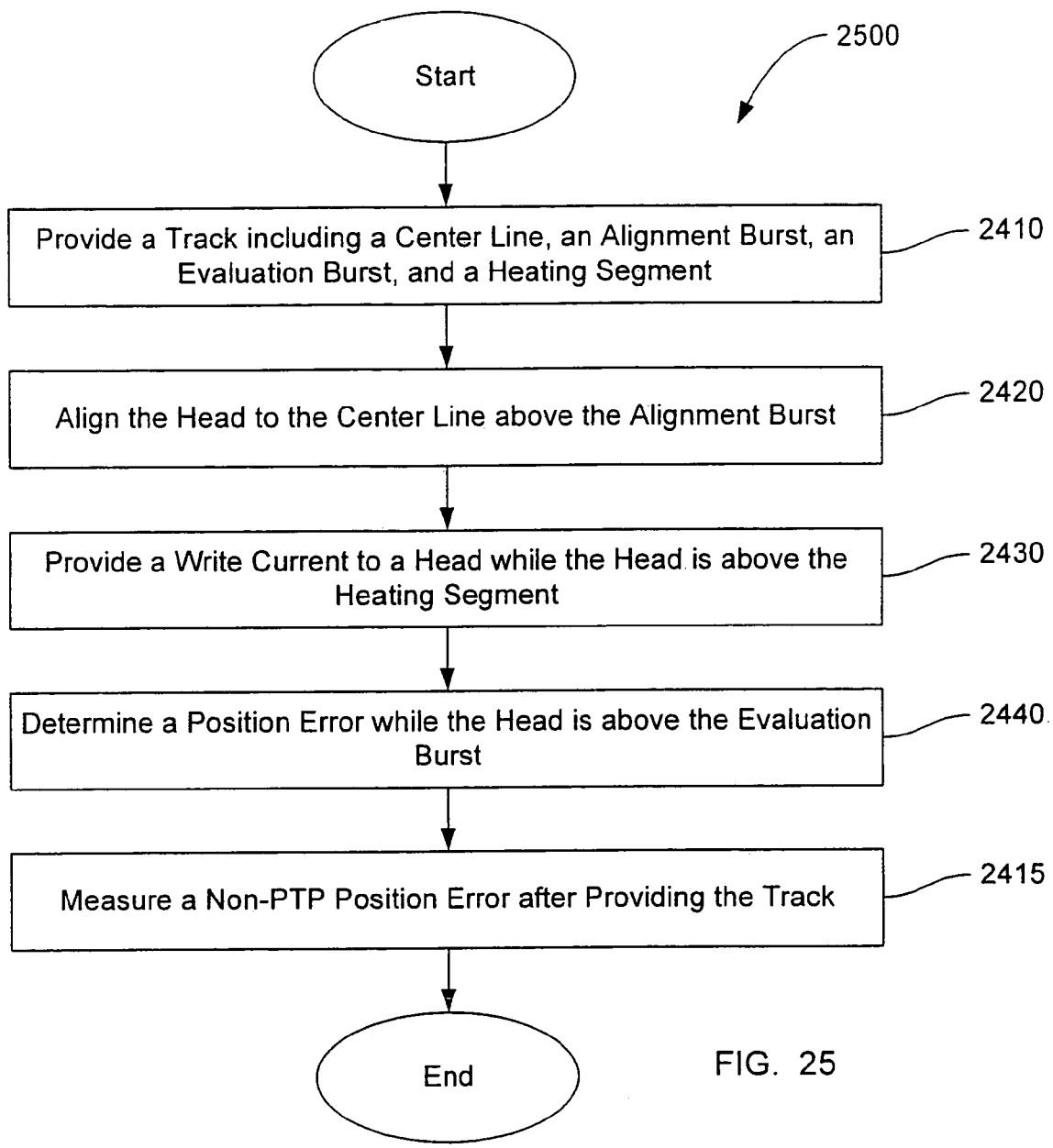
Figure 26:
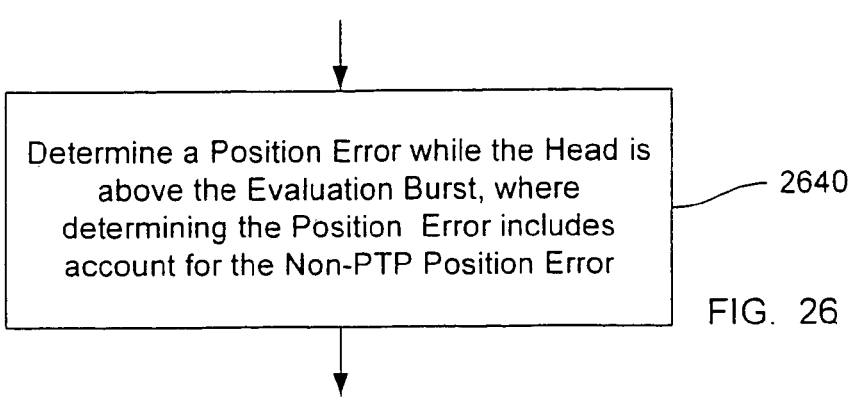

FIGS. 24 and 25 illustrate exemplary methods 2400 and 2500 of the invention comprising steps 2410, 2415, 2420, 2430, and 2440. FIG. 26 shows an exemplary embodiment of the method 2400 in which the step 2640 replaces step 2440.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of measuring a position error due to pole tip protrusion due to writing with a write element of a head, the method comprising:
    providing a track including
        a center line having a circumferential length,
        a servo segment, and
        a heating segment;
    aligning the head to the center line above a first portion of the servo segment;
    providing a write current to the head while the head is above the heating segment; and
    determining a position error while the head is above at least a second portion of the servo segment.

2. The method of claim 1 wherein providing the track includes writing the servo segment with the write element.

3. The method of claim 1 wherein providing the track includes providing a two-frequency servo segment.

4. The method of claim 1 wherein aligning the head includes using a closed-loop servo.

5. The method of claim 4 wherein aligning the head includes using an alignment burst.

6. The method of claim 1 wherein providing the write current to the head while the head is above the heating segment includes terminating the write current as the head reaches a boundary between the heating segment and the servo segment.

7. The method of claim 1 wherein providing the write current to the head while the head is above the heating segment is repeated over a number of successive revolutions before determining the position error.

8. The method of claim 1 wherein the at least the second portion of the servo segment includes an evaluation burst.

9. The method of claim 8 wherein determining the position error while the head is above the at least the second portion of the servo segment includes determining a misregistry while the head is above the evaluation burst.

10. The method of claim 1 wherein aligning the head includes minimizing an initial misregistry and determining the position error includes determining an ending misregistry.

11. The method of claim 1 wherein aligning the head includes measuring an initial misregistry value and determining the position error includes calculating a difference between the initial misregistry value and an ending misregistry.

12. The method of claim 1 further comprising measuring a non-PTP position error after providing the track.

13. The method of claim 12 wherein determining the position error includes accounting for the non-PTP position error.

14. A method of measuring a position error due to pole tip protrusion due to writing with a write element of a head, the method comprising:
   providing a track including
      a center line,
      an alignment burst,
      an evaluation burst, and
      a heating segment;
   aligning the head to the center line above the alignment burst;
   providing a write current to the head while the head is above the heating segment; and
   determining a position error while the head is above the evaluation burst.

15. The method of claim 14 wherein the alignment and evaluation bursts are two-frequency bursts each including a first sub-track having a first frequency and a second sub-track having a second frequency.

16. The method of claim 15 wherein determining the position error includes the use of a bandpass filter having a bandwidth, and wherein the first frequency differs from the second frequency by at least the bandwidth.

17. The method of claim 15 wherein the write element is designed to operate at a data rate frequency and the first and second frequencies are substantially less than the data rate frequency.

18. The method of claim 14 wherein aligning the head includes using a closed-loop servo.

19. The method of claim 14 wherein providing the write current to the head while the head is above the heating segment includes terminating the write current as the head reaches a boundary between the heating segment and the evaluation burst.

20. The method of claim 14 wherein aligning the head includes minimizing an initial misregistry between the head and the centerline and wherein determining the position error includes determining an ending misregistry between the head and the centerline while the head is above the evaluation burst.

21. The method of claim 14 wherein aligning the head includes measuring an initial misregistry between the head and the centerline and determining the position error includes calculating a difference between the initial misregistry and an ending misregistry between the head and the centerline while the head is above the evaluation burst.

22. The method of claim 14 further comprising measuring a non-PTP position error after providing the track.

23. The method of claim 22 wherein determining the position error includes accounting for the non-PTP position error.

24. The method of claim 14 wherein determining the position error includes mapping a misregistry of the head to the track as a function of circumferential position.

* * * * *